US012762379B2

(12) United States Patent
Passalis et al.

(10) Patent No.: US 12,762,379 B2
(45) Date of Patent: Oct. 13, 2026

(54) PROVISIONING DEEP LEARNING (DL) MODELS THAT PRESERVE RELATIONSHIPS BETWEEN RESPONSE VARIABLES AND SELECTED EXPLANATORY VARIABLES

(71) Applicant: Accenture Global Solutions Limited, Dublin (IE)

(72) Inventors: Georgios Passalis, Athens (GR); Neha Chopra, Gurugram (IN); Sneha Chate, Bangalore (IN); Boobesh Rajendran, Navalur (IN); Shiva Tyagi, Dehradun (IN); Rajan Gaba, Gurugram (IN)

(73) Assignee: Accenture Global Solutions Limited, Dublin (IE)

( * ) Notice: Subject to any disclaimer, the term of this patent is extended or adjusted under 35 U.S.C. 154(b) by 686 days.

(21) Appl. No.: 18/334,697

(22) Filed: Jun. 14, 2023

(65) Prior Publication Data

US 2024/0303469 A1 Sep. 12, 2024

(30) Foreign Application Priority Data

Mar. 7, 2023 (GR) .............................. 20230100192

(51) Int. Cl.
*G06N 3/0455* (2023.01)
*G06N 3/088* (2023.01)
*G06N 3/09* (2023.01)

(52) U.S. Cl.
CPC ........... *G06N 3/0455* (2023.01); *G06N 3/088* (2013.01); *G06N 3/09* (2023.01)

(58) Field of Classification Search
CPC .................................................... G06N 3/0455
See application file for complete search history.

(56) References Cited

U.S. PATENT DOCUMENTS

2022/0309116 A1 9/2022 Antoniades

OTHER PUBLICATIONS

Meng, Lingheng, et al. "Research of stacked denoising sparse autoencoder." Neural Computing and Applications 30.7 (2018): 2083-2100. (Year: 2018).*

Lu, Jie, Naveen Verma, and Niraj K. Jha. "Convolutional autoencoder-based transfer learning for multi-task image inferences." IEEE Transactions on Emerging Topics in Computing 10.2 (2021): 1045-1057. (Year: 2021).*

* cited by examiner

*Primary Examiner* — Eric Nilsson
(74) *Attorney, Agent, or Firm* — Seed Intellectual Property Law Group LLP

(57) ABSTRACT

Implementations for training a denoising stacked autoencoder (DAE) using a noisy training dataset comprising a noisy sub-set and a non-noisy sub-set, providing an artificial neural network (ANN) including multiple hidden layers, at least one hidden layer including at least a portion of an encoder of the DAE, the at least a portion of the encoder comprising parameters determined during training of the DAE, training the ANN using a training dataset, and providing a version of the ANN for inference.

20 Claims, 4 Drawing Sheets

PROVISIONING DEEP LEARNING (DL) MODELS THAT PRESERVE RELATIONSHIPS BETWEEN RESPONSE VARIABLES AND SELECTED EXPLANATORY VARIABLES

CROSS-REFERENCE TO RELATED APPLICATIONS

This application claims the benefit of and priority to Greek application Ser. No. 20230100192, filed on Mar. 7, 2023, the disclosure of which is expressly incorporated herein by reference in the entirety for all purposes.

BACKGROUND

Enterprises continuously seek to improve operations. To this end, enterprises seek to model systems and processes to process data and make decisions that affect enterprise operations. To this end, enterprises are increasingly integrating deep learning (DL) (also generally referred to as artificial intelligence (AI) and/or machine learning (ML)) into their systems in an effort to model systems and processes and improve operations and efficiencies. Here, enterprises seek to use DL models to generate predictions based on historical data, which predictions are using in decision-making processes. However, traditional approaches to provisioning DL models include various deficiencies and technical challenges rendering them unsuitable for some enterprise contexts.

SUMMARY

Implementations of the present disclosure are generally directed to a deep learning (DL) system to provision DL models. More particularly, implementations of the present disclosure are directed to a DL system the preserves monotonic relationships and/or non-linear relationships between response variables and explanatory variables in DL models.

In some implementations, actions include training a denoising stacked autoencoder (DAE) using a noisy training dataset comprising a noisy sub-set and a non-noisy sub-set, providing an artificial neural network (ANN) including multiple hidden layers, at least one hidden layer including at least a portion of an encoder of the DAE, the at least a portion of the encoder comprising parameters determined during training of the DAE, training the ANN using a training dataset, and providing a version of the ANN for inference. Other implementations of this aspect include corresponding systems, apparatus, and computer programs, configured to perform the actions of the methods, encoded on computer storage devices.

These and other implementations can each optionally include one or more of the following features: training of the DAE includes unsupervised training; actions further include generating the noisy sub-set by selecting a pre-defined percentage of training samples of the training dataset and randomly adjusting data attributes of the training samples to provide noisy training samples and including the noisy training samples in the noisy sub-set; training of the ANN includes supervised training; the ANN includes a classification model that is trained to predict a class in a set of classes; actions further include tuning the ANN to provide multiple versions of the ANN, the version of the ANN provided for inference determined to be a best performing version of the multiple versions; and the ANN is tuned based on one or more of activation function, learning rate, number of neurons, optimizer, batch size, and number of epochs.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Figure 1:
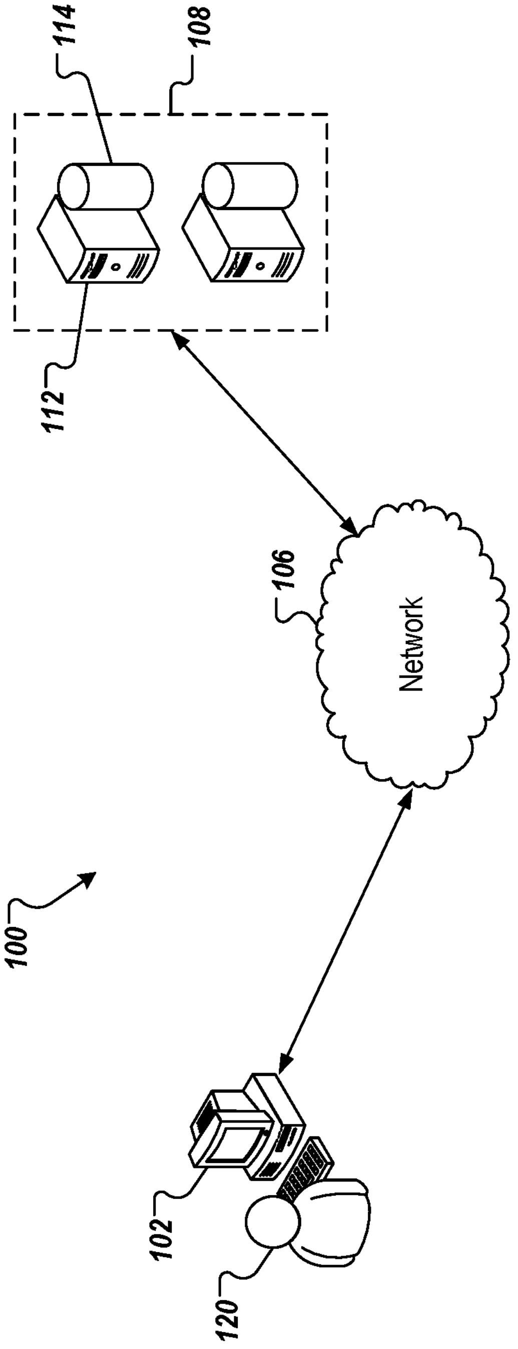
FIG. 1 depicts an example system that can execute implementations of the present disclosure.

Implementations of the present disclosure are generally directed to a deep learning (DL) system to provision DL models that preserve relationships between response variables and explanatory variables. More particularly, the DL system of the present disclosure preserves monotonic relationships and/or non-linear relationships between response variables and explanatory variables. In some implementations, and as described in further detail herein, the DL system of the present disclosure leverages self-supervised learning and includes unsupervised training of a denoising stacked autoencoder (DAE) and supervised training of an artificial neural network (ANN). In some examples, the DAE is configured to extract latent space information from the encoder, which is used as a hidden layer in the ANN.

In some implementations, actions include training a denoising stacked autoencoder (DAE) using a noisy training dataset comprising a noisy sub-set and a non-noisy sub-set, providing an artificial neural network (ANN) including multiple hidden layers, at least one hidden layer including at least a portion of an encoder of the DAE, the at least a portion of the encoder comprising parameters determined during training of the DAE, training the ANN using a training dataset, and providing a version of the ANN for inference.

Implementations of the present disclosure are described in further detail herein with reference to an example use case. The example use case includes win-probability prediction in the example context of quotes in a business-to-business (B2B) scenario in an effort to win a deal between enterprises. In the example context, a sales representative seeks to provide discount values in an effort to optimize win-probability, while reducing margin leakage. In the example use case of optimizing win-probability in view of discounts, it is critical for inferences to be based on suitable discounts to offer for a particular deal. It is contemplated, however, that implementations of the present disclosure can be realized in any appropriate use case and any appropriate context.

To provide further context, and as introduced above, enterprises continuously seek to improve operations. To this end, enterprises seek to model systems and processes that can be based on relationships between explanatory variables and response variables. In some examples, an explanatory variable can be described as an expected cause that explains a result, and a response variable can be described as an expected effect that is responsive to other variables.

Enterprises are increasingly integrating DL into their systems in an effort to model systems and processes and improve operations and efficiencies. Popular DL techniques leverage tree-based DL models (e.g., gradient boosted decision tree (GBDT) models, random forest (RF) models) for structured tabular data. Such DL models are relatively easy to implement and offer good explain-ability (e.g., ability to understand why the DL model made its predictions). However, such DL models and training thereof come with certain boundaries and restrictions that render them impractical for many use cases (e.g., the example use case introduced above). For example, traditional DL models have comparatively poor performance on large complex data with multiple features. As such, desired accuracy cannot be achieved even with hyper-parameter tuning. Further, many use cases rely on balanced data, in which the response variable has an appropriate representation of classes for the DL model to learn and provide predictions on. Other DL techniques, such as ensemble models, are prone to issues of high bias or high variance leading to inaccurate predictions on real world data. With traditional DL techniques, a smooth relationship curve as not achievable. It can further be noted that, for many use cases (e.g., the example use case introduced above), there is a scarcity of labelled training data, which results in an inability to provide a robust DL model.

In view of the foregoing, and as introduced above, implementations of the present disclosure are directed to a DL system to provision DL models that preserve relationships between response variables and explanatory variables. More particularly, the DL system of the present disclosure preserves monotonic relationships and/or non-linear relationships between response variables and explanatory variables. In some implementations, and as described in further detail herein, the DL system of the present disclosure leverages self-supervised learning and includes unsupervised training of a DAE and supervised training an ANN. In some examples, the DAE is configured to extract latent space information from the encoder, which is used as a hidden layer in the ANN.

FIG. 1 depicts an example system 100 that can execute implementations of the present disclosure. The example system 100 includes a computing device 102, a back-end system 108, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 108 includes at least one server system 112, and data store 114. In some examples, the at least one server system 112 hosts one or more computer-implemented systems that can be used to execute one or more enterprise processes. For example, the server system 112 can host systems for training ML models of a HOI detection system in accordance with implementations of the present disclosure.

In accordance with implementations of the present disclosure, the at least one server system 112, or any other appropriate server system can host the DL system of the present disclosure. In some examples, the DL system provisions DL models in a manner that overcomes deficiencies of traditional approaches, as described in further detail herein. So provisioned DL models are used in inference to generate predictions that are used in workflow tasks (e.g., decision-making tasks).

Figure 2:
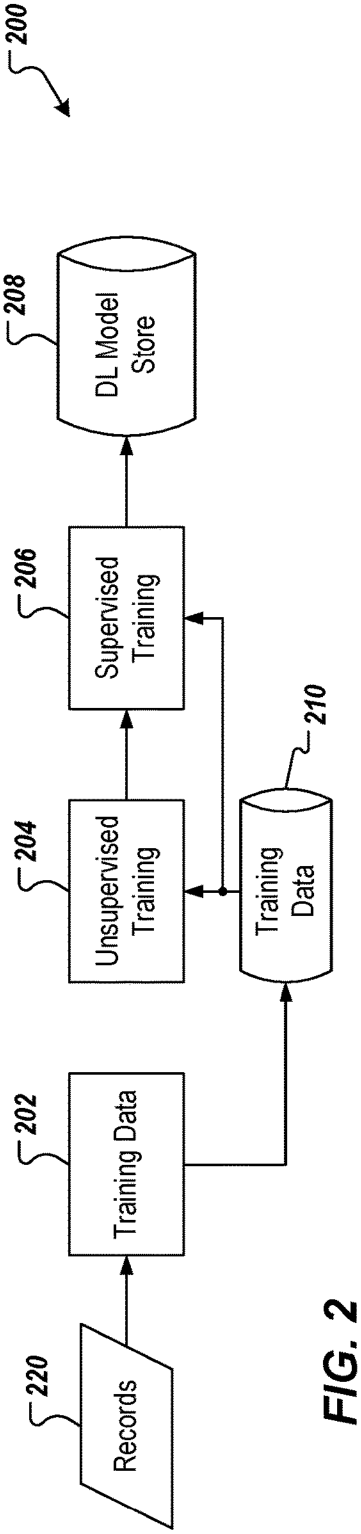
FIG. 2 depicts a conceptual architecture of a deep learning (DL) system in accordance with implementations of the present disclosure.

FIG. 2 depicts a conceptual architecture of a DL system 200 in accordance with implementations of the present disclosure. In the example of FIG. 2, the DL system 200 includes a training data module 202, an unsupervised training module 204, a supervised training module 206, a DL model store 208, and a training data store 210. As described in further detail herein, the DL system 200 processes a set of records 220 to provide training data for training a DL model that is stored in the DL system 200.

In further detail, the set of records 220 includes historical data representative of a use case, for which the DL model is to be provided. With reference to the example use case introduced above, the set of records 210 can include deal-level analytical records, where each record is representative of a deal and includes customer data, product data, and associated deal information (e.g., quantity, price, detail, shipping, discounts). Here, a deal can be representative of an agreement (or disagreement) of multiple enterprises to offered products and/or services. The set of records 220 is processed through the training data module 202 to provide training data that is stored in the training data store 210. In some examples, the training data module 202 pre-processes data in the set of historical records 220, executes feature engineering, correlation analysis, and data distribution analysis on the data, and performs feature selection (e.g., using a RF model) to generate the training data.

In some examples, the training data includes a set of training samples, each set of training samples including a set of features (e.g., embeddings provided as multi-dimensional vectors). In the example use case, each training sample is representative of a deal, and features in the set of features are representative of data that is representative of the deal. In some examples, during training, each training sample is processed, as described in further detail herein, wherein features of the respective set of features is provided as input to a DL model that is being trained.

For training, the training data can be divided into a training dataset and a test dataset. For example, X % (e.g., 80%) of the training data is included in the training dataset and Y % (e.g., 20%) of the training data is included in the test dataset. In some examples, the training data is randomly divided into the training dataset and the test dataset.

In some implementations, noise is injected into the training dataset to provide a noisy training dataset. For example, the noisy training dataset include a noisy sub-set and a non-noisy sub-set. In some examples, an amount of noise is determined based on a pre-defined noise mix of Z % (e.g., 15%). Here, Z % of the training samples in the training dataset are (randomly) selected and are copied to the noisy sub-set. Further, data attributes of the training samples in the noisy sub-set are (randomly) shuffled across rows. In this manner, the noisy sub-set injects stochastics into training to influence learning data representations. That is, the noisy sub-set adds random noise to the training dataset without violating the integrity of the original data.

In accordance with implementations of the present disclosure, training of a DL model is performed in multiple phases. In some examples, the DL model is provided as an ANN. Example ANNs can include, without limitation, convolutional neural networks (CNNs), long short-term memory (LSTM) networks, and generative adversarial networks (GANs). In some examples, the ANN is a feed-forward ANN. As described in further detail herein, in a first phase, a DAE is trained using unsupervised training, and, in a second phase, the ANN is trained using supervised training. In accordance with implementations of the present disclosure, an encoder of the DAE, which is trained in the first phase, is used as a hidden layer in the ANN, which is trained in the second phase.

In general, models (e.g., the DAE, the ANN) are iteratively trained, where, during an iteration, one or more parameters of a model are adjusted, and an output is generated based on the training data. For each iteration, a loss value is determined based on a loss function. The loss value represents a degree of accuracy of the output of the model for the respective iteration. The loss value can be described as a representation of a degree of difference between the input to the model and the expected output of the model. In some examples, if the loss value does not meet an expected value (e.g., is not equal to zero), parameters of the model are adjusted in another iteration of training. In some instances, this process is repeated until the loss value meets the expected value or a number of epochs (iterations) of training have been performed.

To provide further context, autoencoders, such as the DAE, can be described as a special type of feed-forward neural network that is trained to attempt to copy a given input. A feature of an autoencoder is a hidden layer (k) that contains a code or information to represent the input. Autoencoders include an encoder function (e.g., k=f(x), where x is the input) having an objective of mimicking the input as closely as possible, and a decoder function (e.g., r=g(k)) that reconstructs encodings of the hidden layer (k). That is, the decoder tries to reverse engineer the mappings of the encoder provide an output that resembles the input as closely as possible.

There can be multiple hidden layers in an autoencoder making autoencoders strong in performing their tasks. Such autoencoders are referred to as stacked autoencoders (also known as deep autoencoders). However, it is not particularly useful to have an autoencoder simply copy the input and give an output that closely resembles the input. To prevent this, autoencoders can be modified in such a way that they are forced to learn or copy only approximately. This can be achieved by having a concentration layer, which is frequently referred to as a bottleneck layer. Here, the autoencoder learns useful information from less features, inadvertently reducing dimensions.

With regard to training of a DAE, the focus is to train the DAE in such a way that the DAE largely learns from the latent space, which can be described as the latent representation of information in the encoder. This is technically an unsupervised learning process, in which an objective is to learn on all training data (e.g., labeled and unlabeled). There are multiple ways to train a DAE to learn latent representations, which can include denoising, as described herein. That is, the DAE is trained on corrupted (noisy) training samples to predict the original uncorrupted training sample as output. Traditionally, this is achieved by adding a Gaussian noise to the input or a regularization in the DAE. However, this approach does not yield satisfactory result with structured tabular data, which is often provided in the context of enterprise operations, such as the example use case introduced above. This is primarily because input data corruption is often punitive exercise for training DL models for structured data. For example, unlike image data, the signals cannot simply be adjusted close to zero, because that will have an entirely different effect on model training.

Implementations of the present disclosure address this problem by using a noise mix in the training samples, which is described above with reference to providing a training dataset having a noisy sub-set and a non-noisy subset. Here, and as discussed herein, the training data (input to the DAE during training) is mixed with its own corrupted samples. The objective is that the randomly sampled portion of data when shuffled (randomly) will act as noise when mixed with the overall training data. Through this, implementations of the present disclosure change the inherently deterministic nature of autoencoders into a stochastic nature. Also, and as described in further detail herein, a drop-out layer is added further force the DAE to learn better thereby increasing overall robustness.

Figure 3:
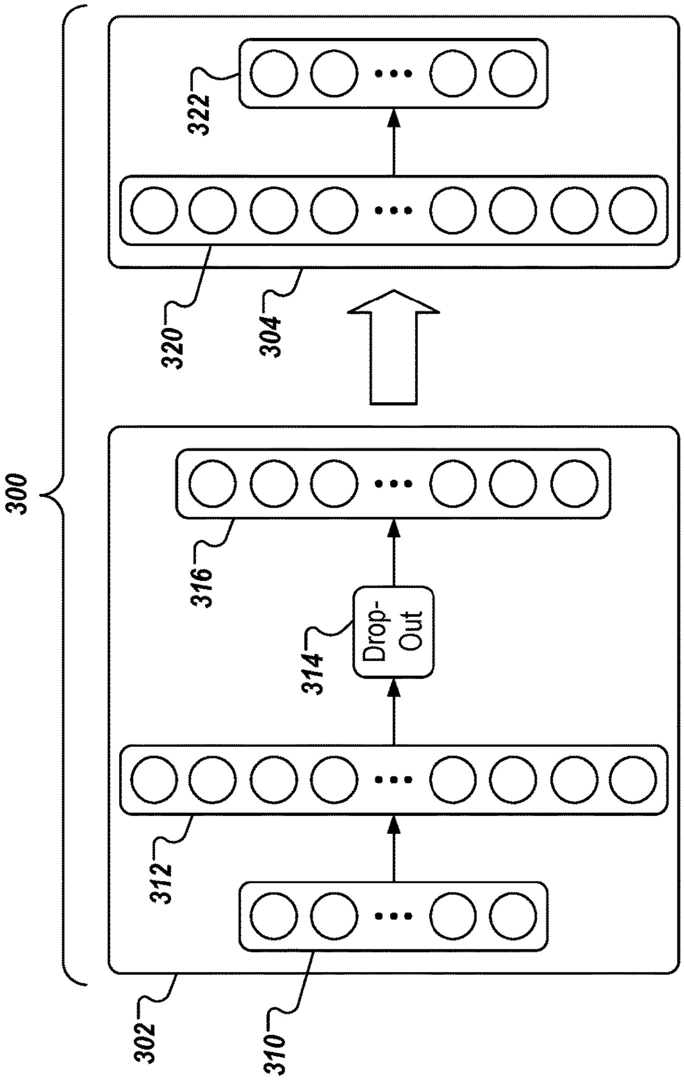
FIG. 3 depicts a denoising stacked autoencoder (DAE) for unsupervised training in accordance with implementations of the present disclosure.

FIG. 3 depicts a DAE 300 for unsupervised training in accordance with implementations of the present disclosure. In the example of FIG. 3, the DAE 300 includes an encoder 302 and a decoder 304. In some examples, the encoder 302 encodes an input (training sample) to provide an encoded representation, and the decoder 304 processes the encoded representation to provide an output that is a reconstruction of the input. The goal of the decoder 304 is to provide the output to be as close to an exact reconstruction of the input as possible (given training constraints).

In the example of FIG. 3, the encoder 302 of the DAE 300 includes an input layer 310, a first hidden layer 312, a drop-out layer 314, and a second hidden layer 316. It is contemplated, however, that the DAE 300 can include other numbers of layers (e.g., more than two hidden layers). In some examples, the input layer 310 includes F (e.g., 10 features), the first hidden layer includes $n_{1,DAE}$ (e.g., 28) neurons, and the second hidden layer includes $n_{2,DAE}$ (e.g., 24) neurons. In some examples, the drop-out layer 314 includes a drop-out rate of D % (e.g., 20%). That is, the drop-out layer 314 deactivates D % of the activations of the hidden layer provided as input to the drop-out later, which is the first hidden layer 312 in FIG. 3. In the example of FIG. 3, the decoder 304 includes a third hidden layer 320 and a fourth hidden layer 322. In some examples, the third hidden layer 320 includes $n_{3,DAE}$ (e.g., 28) neurons and the fourth hidden layer 322 includes $n_{4,DAE}$ (e.g., 10) neurons. In some examples, the fourth hidden layer 322 provides the output of the DAE 300, which includes F (e.g., 10 features).

In accordance with implementations of the present disclosure, the DAE 300 is trained (e.g., by the unsupervised training module 204 of FIG. 2) using the noisy training dataset (e.g., retrieved from the training data store 210), which include the noisy sub-set and the non-noisy sub-set. During unsupervised training, the loss function is based on comparing the output of the DAE 300 to the input to the DAE 300, where the loss represents a degree of difference between the output of the DAE 300 and the original input (without noise). In some examples, unsupervised training of the DAE 300 uses binary cross-entropy as the loss function, stochastic gradient descent as an optimizer (e.g., with a learning rate of 1.5), a metric of accuracy (e.g., how accurate is the output to the input), and a pre-defined number of epochs (e.g., 22 epochs).

Figure 4:
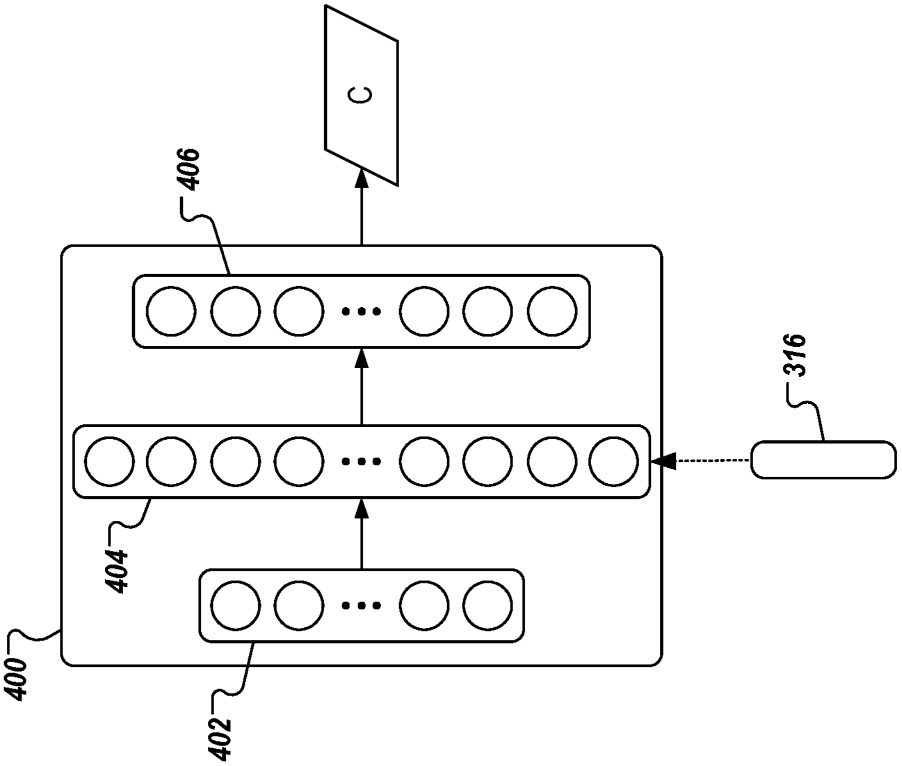
FIG. 4 depicts an artificial neural network (ANN) for supervised training in accordance with implementations of the present disclosure.

After training of the DAE, the ANN is trained using supervised training. FIG. 4 depicts an ANN 400 for supervised training in accordance with implementations of the present disclosure. In the example of FIG. 4, the ANN 400 includes an input layer 402, a first hidden layer 404, and a second hidden layer 406. In some examples, the ANN 400 processes an input (training sample) to provide an output that is a predicted class from a set of classes. That is, for example, the ANN 400 predicts a class of the set of classes that the input is determined to belong to. In this sense, the ANN 400 can be described as a classification model. In the example of FIG. 4, the input layer 402 includes F (e.g., 10) features and the second hidden layer 406 includes $n_{2,ANN}$ (e.g., 16) neurons.

In accordance with implementations of the present disclosure, the first hidden layer 404 is provided as at least a portion of the encoder 302 of the (trained) DAE 300. In some examples, parameters of the second hidden layer 316 of the DAE 300 are copied to the first hidden layer 404 of the ANN 400, prior to training of the ANN 400. As such, the neurons within the first hidden layer 404 have the encoded weights provided from the second hidden layer 316 through training of the DAE 300. For training of the ANN 400, described in further detail herein, the parameters in the first hidden layer 404 copied from the second hidden layer 316 of the DAE 300 are initialized parameters of the first hidden layer 404. During training of the ANN 400, these parameters of the first hidden layer 404 are updated with each epoch. In this manner, the ANN 400 does not start training from scratch with random initialized parameters in all layers.

In accordance with implementations of the present disclosure, the ANN 400 is trained (e.g., by the supervised training module 206 of FIG. 2) using the training dataset (e.g., retrieved from the training data store 210), which includes the original, non-noisy training samples. During supervised training, the loss function is based on comparing the output of the ANN, which is provided as a class (C) in a set of classes to a class label assigned to the respective training sample, where the loss represents a degree of difference therebetween (e.g., is the predicted class the same as the class label). In some examples, supervised training of the ANN 400 uses binary cross-entropy as the loss function.

In some implementations, after the ANN 400 is trained, the ANN 400 can be tested using the test dataset. In some examples, testing of the ANN 400 can include processing training samples of the test dataset to determine metrics of metrics of accuracy, precision, recall, and area-under-curve (AUC) score. In some examples, if at least a sub-set of the metrics achieve threshold values (e.g., minimum accuracy), the ANN 400 is determined to be successfully trained. In some examples, if the sub-set of the metrics do not achieve the threshold values, the ANN 400 is retrained.

In some implementations, hyperparameters of the (trained) ANN 400 can be tuned based on activation function, learning rate, number of neurons, optimizer, batch size, and number of epochs. In some examples, tuning is performed using Hyperopt, which can be described as a Python library for hyperparameter optimization that uses Bayesian optimization for parameter tuning to determine optimized parameters for a given model. In some examples, a search space methodology is implemented for all hyperparameters of the ANN 400, where a custom list of values for is determined for each hyperparameter. In tuning, multiple versions of the ANN 400 can be provided, each with a respective tuning. For example, tens, hundreds, even thousands of versions of the ANN 400 can be provided. In some examples, each version of the ANN 400 is compared to a set of metrics (e.g., accuracy, precision, recall, AUC score) and a best-performing version of the ANN 400 is selected for inference.

In some implementations, the ANN is deployed to one or more enterprise systems for inference. For example, an enterprise system can provide input to the ANN, which process the input to provide output of a predicted class. The enterprise can use the predicted class in one or more downstream tasks of a workflow.

For example, and with non-limiting reference to the example use case, input to the ANN can include data representative of a deal that the enterprise is seeking to close (win). The predicted class can be one of a set of classes including highly likely, somewhat likely, equal chance, somewhat unlikely, and highly unlikely. In some examples, the enterprise can make a decision based on the predicted class. For example, if the predicted class is highly likely (i.e., that the deal will be accepted), the enterprise can set forth the detail to one or more other parties. As another example, if the predicted class is highly unlikely (i.e., that the deal will be accepted), the enterprise can change aspects of the deal (e.g., add or increase discounts) and re-run the prediction with the changed aspects.

In the example use case, an objective is to determine win-probability of a current deal from historical deals for all possible discount values, for example. This enables agents of the enterprise (e.g., sales representatives) to give discount values ensuring optimal win-probability, while reducing margin leakage. As noted above, traditional DL approaches cannot provide a smooth, non-linear relationship between win-probability and discount. This can result from, for example, insufficient volume of labeled deals data in the historical records. In view of this, implementations of the present disclosure set forth an architecture and training of an ANN that effectively learns on the available, albeit limited deals data.

Figure 5:
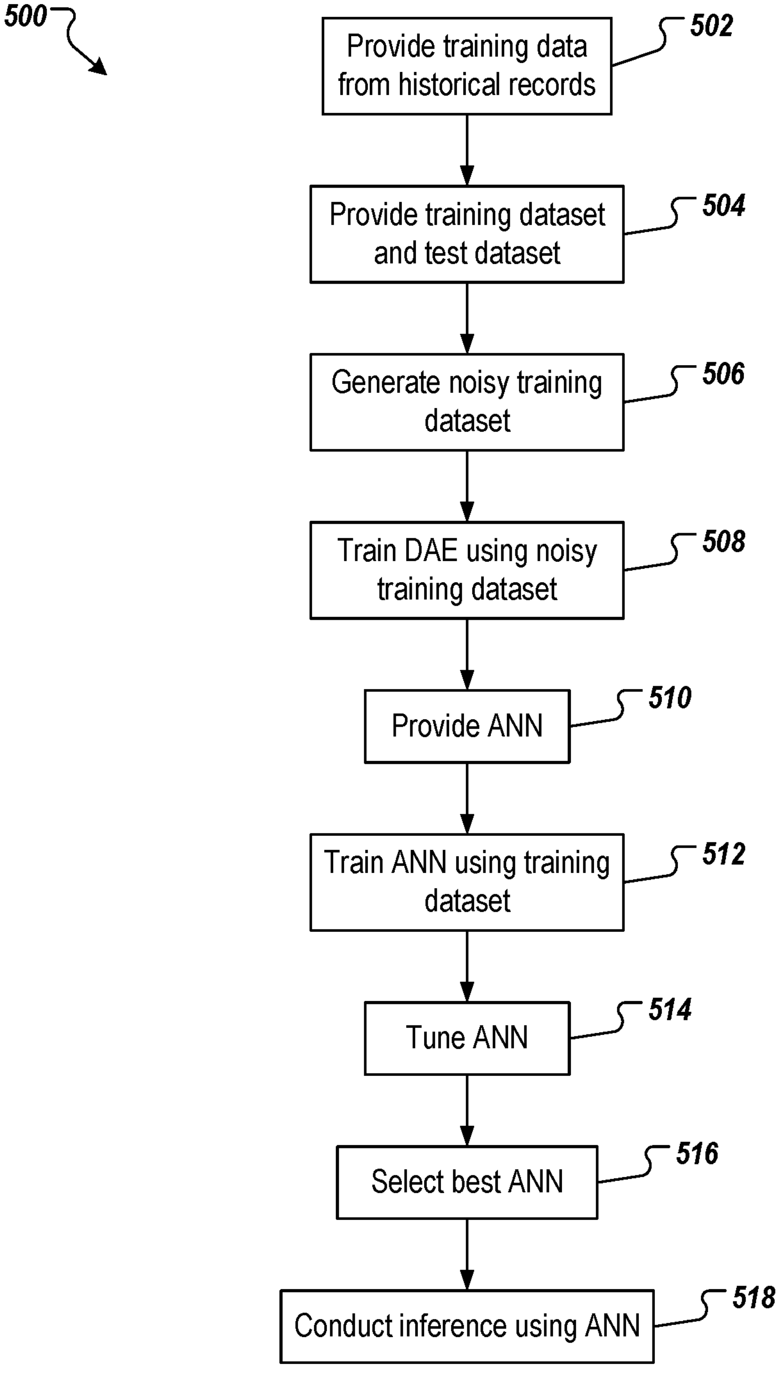
FIG. 5 depicts an example process that can be executed in accordance with implementations of the present disclosure.

FIG. 5 depicts an example process 500 that can be executed in implementations of the present disclosure. In some examples, the example process 500 is provided using one or more computer-executable programs executed by one or more computing devices.

Training data is provided from historical records (502). For example, and as described in detail herein with reference to FIG. 2, the training data module 202 pre-processes data in the set of historical records 220, executes feature engineering, correlation analysis, and data distribution analysis on the data, and performs feature selection (e.g., using a RF model) to generate the training data. A training dataset and a test dataset are provided (504). For example, and as described in detail herein, the training data can be divided into a training dataset and a test dataset. For example, X % (e.g., 80%) of the training data is included in the training dataset and Y % (e.g., 20%) of the training data is included in the test dataset. In some examples, the training data is randomly divided into the training dataset and the test dataset.

A noisy training dataset is generated (506). For example, and as described in detail herein, noise is injected into the training dataset to provide a noisy training dataset. For example, the noisy training dataset include a noisy sub-set and a non-noisy sub-set. In some examples, an amount of noise is determined based on a pre-defined noise mix of Z % (e.g., 15%), where were Z % of the training samples in the training dataset are (randomly) selected and include in the noisy sub-set, and data attributes of the training samples in the noisy sub-set are (randomly) shuffled across rows.

A DAE is training using the noisy training dataset (508). For example, and as described in detail herein, the DAE 300 is trained (e.g., by the unsupervised training module 204 of FIG. 2) using the noisy training dataset (e.g., retrieved from the training data store 210), which include the noisy sub-set and the non-noisy sub-set. An ANN is provided (510). For example, and as described in detail herein with reference to FIGS. 3 and 4, the ANN 400 includes an input layer 402, a first hidden layer 404, and a second hidden layer 406, where the second hidden layer 316 of the DAE 300 is copied to the ANN 400 as the first hidden layer 404. Accordingly, and as described herein, noisy data is used to train the DAE 300, which is validated by comparing the output and the original training data without noise to validate that the DAE 300 is robustly trained without overfitting. Further, by copying the second hidden layer 316 to the ANN 400, training of the ANN 400 starts with information coming from the DAE 300, which is already trained on the noisy data. This helps the training process of ANN 400 to be more strong and help converge faster even on lower volumes of data.

The ANN is training using the training dataset (512). For example, and as described in detail herein, the ANN 400 is trained (e.g., by the supervised training module 206 of FIG. 2) using the training dataset (e.g., retrieved from the training data store 210), which includes the original, non-noisy training samples. The ANN is tuned (516). For example, and as described in detail herein, hyperparameters of the (trained) ANN 400 can be tuned based on activation function, learning rate, number of neurons, optimizer, batch size, and number of epochs to provide multiple versions of the ANN 400. A best performing version of the ANN is selected (516). For example, and as described in detail herein, each version of the ANN 400 is compared to a set of metrics (e.g., accuracy, precision, recall, AUC score) and a best-performing version of the ANN 400 is selected for inference. Inference is conducted using the ANN (518). For example, and as described in detail herein, the ANN is deployed to one or more enterprise systems for inference. For example, an enterprise system can provide input to the ANN, which process the input to provide output of a predicted class. The enterprise can use the predicted class in one or more downstream tasks of a workflow.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for training deep learning (DL) models, the method comprising:

training a denoising stacked autoencoder (DAE) using a noisy training dataset comprising a noisy sub-set and a non-noisy sub-set;

wherein the noisy sub-set is generated by:

selecting a pre-defined percentage of training samples from a training dataset and copying the selected training samples into the noisy sub-set, and randomly adjusting data attributes of the selected training samples across rows to introduce noise;

providing an artificial neural network (ANN) comprising multiple hidden layers, wherein at least one hidden layer comprising at least a portion of an encoder of the trained DAE, and wherein the at least a portion of the encoder comprising parameters of the at least one hidden layer determined during training of the DAE;

training the ANN using the training dataset; and providing a version of the ANN for inference.

2. The method of claim 1, wherein training of the DAE comprises unsupervised training.

3. The method of claim 1, wherein training of the ANN comprises supervised training.

4. The method of claim 1, wherein the ANN comprises a classification model that is trained to predict a class in a set of classes.

5. The method of claim 1, further comprising tuning the ANN to provide multiple versions of the ANN, the version of the ANN provided for inference determined to be a best performing version of the multiple versions.

6. The method of claim 5, wherein the ANN is tuned based on one or more of activation function, learning rate, number of neurons, optimizer, batch size, and number of epochs.

7. The method of claim 1, further comprising adding a drop-out layer to the DAE, wherein the drop-out layer deactivates a pre-defined percentage of activations in at least one of hidden layer provided as input to the drop-out layer during training.

8. A system, comprising:

one or more processors; and a computer-readable storage device coupled to the one or more processors and having instructions stored thereon which, when executed by the one or more processors, cause the one or more processors to perform operations for training deep learning (DL) models, the operations comprising:

training a denoising stacked autoencoder (DAE) using a noisy training dataset comprising a noisy sub-set and a non-noisy sub-set;

wherein the noisy sub-set is generated by:

selecting a pre-defined percentage of training samples from a training dataset and copying the selected training samples into the noisy sub-set, and randomly adjusting data attributes of the selected training samples across rows to introduce noise;

providing an artificial neural network (ANN) comprising multiple hidden layers, wherein at least one hidden layer comprising at least a portion of an encoder of the trained DAE, and wherein the at least a portion of the encoder comprising parameters of the at least one hidden layer determined during training of the DAE;

training the ANN using the training dataset; and providing a version of the ANN for inference.

9. The system of claim 8, wherein training of the DAE comprises unsupervised training.

10. The system of claim 8, wherein training of the ANN comprises supervised training.

11. The system of claim 8, wherein the ANN comprises a classification model that is trained to predict a class in a set of classes.

12. The system of claim 8, wherein operations further comprise tuning the ANN to provide multiple versions of the ANN, the version of the ANN provided for inference determined to be a best performing version of the multiple versions.

13. The system of claim 12, wherein the ANN is tuned based on one or more of activation function, learning rate, number of neurons, optimizer, batch size, and number of epochs.

14. The system of claim 8, further comprising adding a drop-out layer to the DAE, wherein the drop-out layer deactivates a pre-defined percentage of activations in at least one of hidden layer provided as input to the drop-out layer during training.

15. Computer-readable storage media coupled to the one or more processors and having instructions stored thereon which, when executed by the one or more processors, cause the one or more processors to perform operations for training deep learning (DL) models, the operations comprising:

training a denoising stacked autoencoder (DAE) using a noisy training dataset comprising a noisy sub-set and a non-noisy sub-set;

wherein the noisy sub-set is generated by:

selecting a pre-defined percentage of training samples from a training dataset and copying the selected training samples into the noisy sub-set, and randomly adjusting data attributes of the selected training samples across rows to introduce noise;

providing an artificial neural network (ANN) comprising multiple hidden layers, wherein at least one hidden layer comprising at least a portion of an encoder of the trained DAE, and wherein the at least a portion of the encoder comprising parameters of the at least one hidden layer determined during training of the DAE;

training the ANN using the training dataset; and providing a version of the ANN for inference.

16. The computer-readable storage media of claim 15, wherein training of the DAE comprises unsupervised training.

17. The computer-readable storage media of claim 15, wherein training of the ANN comprises supervised training.

18. The computer-readable storage media of claim 15, wherein the ANN comprises a classification model that is trained to predict a class in a set of classes.

19. The computer-readable storage media of claim 15, wherein operations further comprise tuning the ANN to provide multiple versions of the ANN, the version of the ANN provided for inference determined to be a best performing version of the multiple versions.

20. The computer-readable storage media of claim 15, further comprising adding a drop-out layer to the DAE, wherein the drop-out layer deactivates a pre-defined percentage of activations in at least of hidden layer provided as input to the drop-out layer during training.

* * * * *